(12) United States Patent
Dellow et al.

(10) Patent No.: US 7,698,718 B2
(45) Date of Patent: Apr. 13, 2010

(54) METHOD AND SYSTEM FOR RESTRICTING USE OF DATA IN A CIRCUIT

(75) Inventors: Andrew Dellow, Gloucestershire (GB); Peter Bennett, Bristol (GB)

(73) Assignee: STMicroelectronics Limited, Bristol (GB)

( * ) Notice: Subject to any disclaimer, the term of this patent is extended or adjusted under 35 U.S.C. 154(b) by 765 days.

(21) Appl. No.: 11/461,306

(22) Filed: Jul. 31, 2006

(65) Prior Publication Data

US 2007/0180464 A1  Aug. 2, 2007

(30) Foreign Application Priority Data

Jul. 29, 2005 (EP) .................................. 05254789

(51) Int. Cl.
*H04N 7/16* (2006.01)
*H04N 7/167* (2006.01)

(52) U.S. Cl. .............................. 725/28; 725/25; 725/26; 725/27; 725/29; 725/30; 725/31

(58) Field of Classification Search .............. 725/25–31
See application file for complete search history.

(56) References Cited

U.S. PATENT DOCUMENTS 5,949,877 A  9/1999 Traw et al.

| | | | |
|---|---|---|---|
| 6,199,053 B1 | 3/2001 | Herbert et al. | |
| 6,587,947 B1 | 7/2003 | O'Donnell et al. | |
| 2003/0056211 A1 * | 3/2003 | Van Den Heuvel | ............ 725/25 |
| 2004/0054906 A1 | 3/2004 | Carro | |
| 2004/0059917 A1 | 3/2004 | Powers | |
| 2005/0141712 A1 | 6/2005 | Koo et al. | |

FOREIGN PATENT DOCUMENTS

| EP | 0428252 B1 | 11/1997 |
|---|---|---|
| EP | 1331818 A1 | 7/2003 |
| EP | 1560361 A1 | 8/2005 |

* cited by examiner

*Primary Examiner*—Hunter B. Lonsberry
(74) *Attorney, Agent, or Firm*—Lisa K. Jorgenson; Robert Iannucci; Seed IP Law Group PLLC

(57) ABSTRACT

An integrated circuit restricts use of a data item and includes a data memory storing the data item; a value memory storing a value; a signature input that receives a signature derived from data in a data item field and a value in a value field, the signature being in a coded form; a decoding circuit that decodes the signature and outputs information representing the data in the data item field and the value in the value field; and a comparison circuit that receives the decoding circuit output, determines whether the information representing the data from the data item field corresponds to the stored data item and whether the information representing the value from the value field corresponds to the value stored in the value memory, and outputs a comparison signal according to the determinations. The circuit restricts the use of the data item according to the comparison signal.

49 Claims, 3 Drawing Sheets

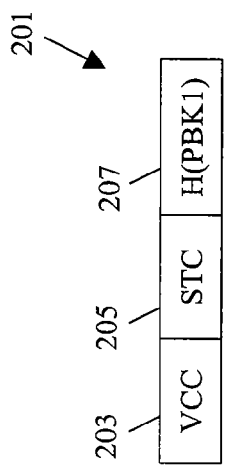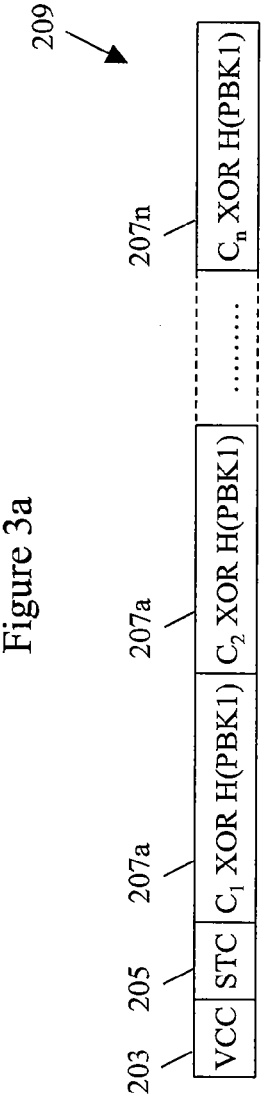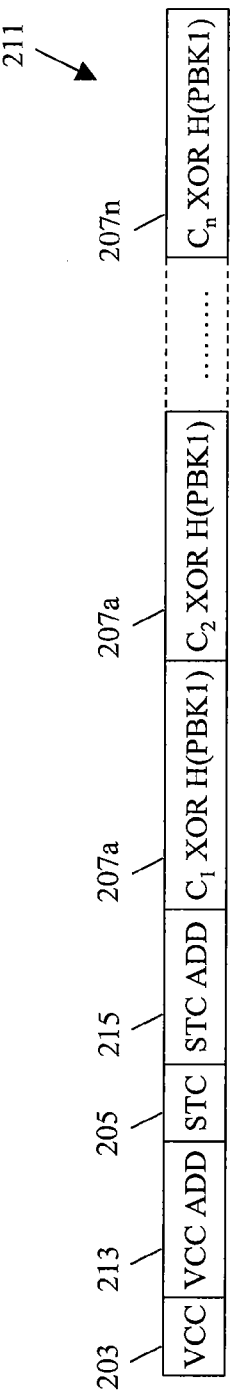
Figure 3a
Figure 3b
Figure 3c

METHOD AND SYSTEM FOR RESTRICTING USE OF DATA IN A CIRCUIT

BACKGROUND OF THE INVENTION

1. Field of the Invention

The present invention relates to semiconductor integrated circuits, and in particular to circuits in which the use of particular data in particular circuits is desired to be restricted.

2. Description of the Related Art

In many electronic devices it is often necessary to make restriction on the data that can be used within the device. This is illustrated in the following example. In a subscriber based pay-television system, television signals broadcast over air in an encrypted form are received and a set-top-box is used to decrypt the signals so that broadcast services may be viewed. In such a system, one or more cryptographic keys are required to decrypt the encrypted television signals. A set-top-box belonging to a subscriber acquires the cryptographic keys necessary to decrypt the television signals corresponding to a particular broadcast service only when the necessary payment has been made to the broadcast service provider.

Usually, there are several broadcast service providers, each providing their own set of broadcast services. Accordingly, the set of cryptographic keys used to decrypt the television signals of one broadcast service provider are different to the set of cryptographic keys used to decrypt the television signals of a different broadcast service provider. Usually, when set-top-boxes are distributed by a set-top-box manufacturer or sold by a retailer, each set-top-box is intended to be used in conjunction with the services provided by a particular broadcast service provider. Accordingly, it is desirable to prevent cryptographic keys associated with one broadcast service provider from being used in a set-top-box that is intended to be used only in conjunction with the services of another broadcast service provider.

Often, a subscription is paid to enable access to broadcast services for a limited period of time, for example to enable access to a particular film channel for a year. In this case, it is desirable to allow the cryptographic keys used to decrypt the television signals corresponding to the service to be used in a set-top-box for a year, and thereafter to prevent the cryptographic keys from being used by the set-top-box.

The set-top-boxes are controlled by software which may be updated periodically to provide improved user interfaces, to fix software bugs or to expand the range of services or general functionality provided by a set-top-box. When a software upgrade is downloaded to a set-top-box it is desirable that the old version of the software is prevented from being used by the set-top-box to ensure that only the most recent software is used. The software requires one or more cryptographic keys to function properly. Usually, when a piece of software is updated, the cryptographic keys used by the software are also updated. In this case, it is desirable to prevent cryptographic keys associated with an old version of software from being used in a set-top-box to in turn prevent the old software from being used We have appreciated that, in general, the use of particular data of many types within a device may need to be restricted to a particular group of devices, to a particular period of time or be subjected to many other types of restriction.

BRIEF SUMMARY OF THE INVENTION

An embodiment of the invention comprises a semiconductor integrated circuit contained within a set-top-box and a separate control module. Software executed by the circuit uses data in the form of a cryptographic key, PBK1 which is associated with a particular broadcast service provider and with a particular version of the software. Each broadcast service provider may be identified by a unique sales type control (STC) value and each version of the software may be identified by a unique version control code (VCC) value. PBK1 is therefore associated with a particular STC value and a particular VCC value. The circuit stores the STC value corresponding to the broadcast service provider whose services the set-top-box is intended to be used in conjunction with. The circuit also stores the VCC value corresponding to the latest available version of the software.

A key signature stored in the circuit is used to verify that PBK1 is associated with the latest version of the software being executed in the set-top-box and that PBK1 is associated with the broadcast service provider whose services the set-top-box is intended to be used in conjunction with. A key signature corresponding to a particular key is generated by the control module by encrypting a string formed by concatenating the STC value and the VCC value of that key and a hash value of the key. The string is encrypted using a private encryption key, PVK0, known only to an authority who controls the control module so that only the authority can generate valid signatures.

When PBK1 is used by the software being executed by the circuit, the circuit decrypts the signature using a public decryption key, PBK0, and extracts the STC value, the VCC value and the hash value contained in the signature. The circuit also generates a hash value of PBK1. The circuit first compares the generated hash value with the hash value extracted from the signature to check that the signature is valid with respect to PBK1. Next, the circuit compares the STC value and the VCC value extracted from the signature respectively with the STC value and the VCC value stored in the circuit. If all three comparisons result in a match then use of PBK1 by the software is allowed otherwise use of PBK1 is not allowed.

When a subscriber subscribes to a particular broadcast service, the broadcast service provider transmits the necessary software and associated cryptographic keys, including PBK1, to the subscriber's set-top-box. The broadcast service provider transmits PBK1 to the authority which uses the control module to generate the corresponding signature according to the identity of the broadcast service provider and the version of the software PBK1 is associated with. The broadcast service provider then provides the signature to the subscriber.

In one embodiment the STC value is stored in the circuit in a one-time-programmable memory so that the stored value cannot be modified. The VCC value is stored in the circuit in a memory arranged such that the stored value can be increased, but not decreased. In this way, when a software upgrade and associated updated keys are downloaded by the set-top-box, the stored VCC value can be increased to allow the updated keys and software to be used.

BRIEF DESCRIPTION OF THE SEVERAL VIEWS OF THE DRAWINGS

FIGS. 3a, 3b and 3c are schematic diagrams of various key signatures having different formats.

DETAILED DESCRIPTION OF THE INVENTION

A wide variety of techniques for broadcast transmission are known in which the broadcast signal is encoded, scrambled or encrypted in some way to allow only authorized recipients to retrieve the original signal. One particular field in which this area has been researched is broadcast television.

The broadcast of television signals in which only permitted or authorized recipients can produce the clear television picture from those signals is known as Conditional Access Television or Pay-Television. In this context, broadcast can include over-air, via satellite, by cable or indeed any appropriate distribution medium in which the same signal content is sent to many recipients. Television signals may be analog signals or digital signals. The term "scrambling" is often used for the process of rendering analog signals unusable until "descrambled", whereas the terms "encryption" and "decryption" are more often used for digital signals. In either case, the aim is to only allow users that have paid a subscription to descramble/decrypt the signals.

Figure 1:
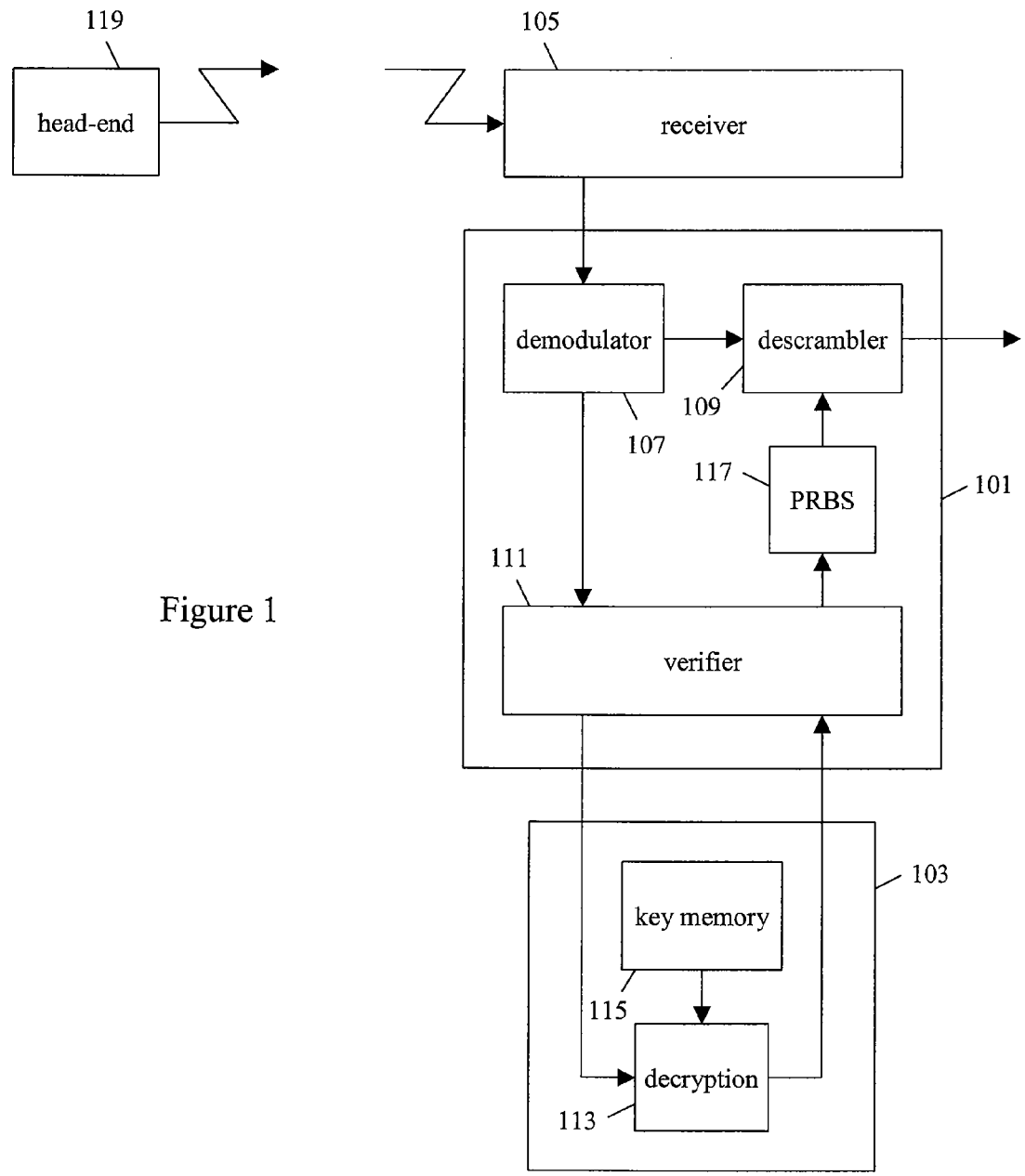
FIG. 1 is a schematic diagram of a known pay-television system.

A known system and receiver for processing received signals is described in EP 0,428,252 which is illustrated in FIG. 1. The concept in this system is to broadcast signals in the air (by satellite) which can be received by anyone, but only rendered usable by recipients having a "set top box" or television decoder 101 and an associated smart card 103. The decoders 101 of all recipients are identical, but the smart cards 103 contain unique secrets, including entitlements, which specify which channels or programs within the broadcast signals the user is permitted to watch. The entitlements may be in the form of cryptographic keys, each associated with an individual channel or program. The system operates broadly as follows:

A television signal is broadcast over air in a scrambled form and includes a stream of control data describing how the television signal is to be descrambled. The broadcast signals originate from a head-end 119 which scrambles the television signals and broadcasts these together with the control data. The television signals and control data for a particular broadcast are the same signal sent to all users. It is not feasible to send the signals uniquely scrambled/encrypted to each recipient as there may be tens of millions of users and this would require tens of millions of times the bandwidth. Accordingly, all recipients are able to operate the same descrambling/decryption process. This is implemented in the decoder 101 which receives the broadcast signals from a receiver 105. A data demodulator 107 extracts the portion of the signal for picture and/or sound and provides this to a descrambler 109 for descrambling. The control data portion is extracted and provided to a verifier 111. The control data comprises encrypted control words that instruct the descrambler 109 how to descramble the picture/sound signal. The control words used to descramble the signals associated with a particular channel or program typically are encrypted using a unique cryptographic key associated with that channel or program. The control words are therefore decrypted, and it is for this purpose that the smart card 103 is provided.

The verifier 111 provides encrypted control words across an interface to the smart card 103. The smart card 103 comprises a decryption circuit 113 which receives the encrypted control words which are decrypted according to an algorithm using a cryptographic key retrieved from a key memory 115 in the smart card 103. If the user is entitled to watch the chosen channel or program, the smart card 103 will contain the appropriate cryptographic key associated with that channel or program allowing the corresponding control words to be properly decrypted. The decrypted control words are provided to the verifier 111. The verifier 111 passes the decrypted control words to a pseudo-random bit sequence generator (PRBS) 117 which in turn provides a descrambling code to the descrambler 109. It should be noted that the control words and hence the descrambling code change frequently (every few seconds). The security in this arrangement is thus that it is not feasible to try and decrypt the control words in real time without the smart card algorithm. Also, in the event that the smart card algorithm is compromised, then the smart cards 103 themselves can be re-issued to all subscribers. Lastly, to view any channels or programs, a user must pay for "entitlements" which are broadcast over air addressed uniquely to each user and stored in the smart card 103.

In other systems, the components on the smart card 103 such as the key memory 115 and the decryption circuit 113 are incorporated into the decoder 101, thereby eliminating the need for a separate smart card 103.

Figure 2:
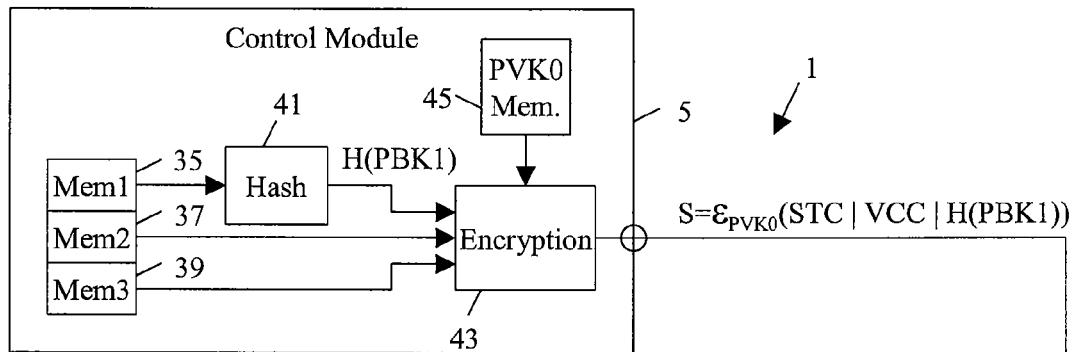
FIG. 2 is a schematic diagram of a system according to one embodiment of the invention.
Figure 2:
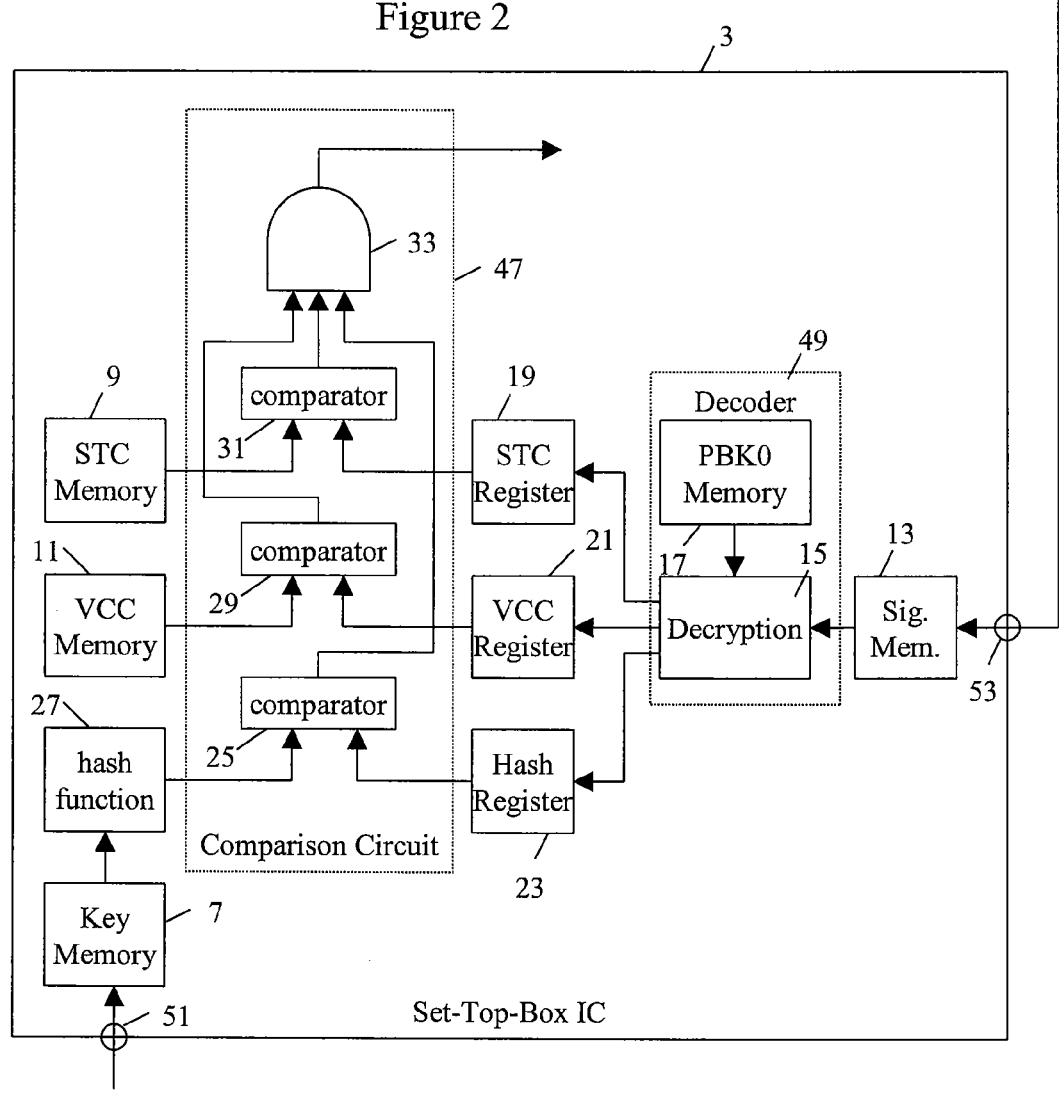

FIG. 2 shows a system 1 according to one embodiment the present invention. The system 1 comprises a semiconductor integrated circuit 3, which forms part of a set-top-box for use in a pay-television system, and a separate control module 5 which is used to maintain control of the features of the circuit 3. The set-top-box may be referred to as a receiver side of the system whereas the control module 5 may be referred to as a head-end side of the system. The set-top-box may be used to decrypt encrypted television signals, corresponding to broadcast services, so that the broadcast services can be viewed.

The broadcast services may be provided by several broadcast service providers with each service provider providing their own specific package of broadcast services. The right to access broadcast services of a particular service provider may be obtained by making the appropriate subscription payment. Often, a person is required to purchase a set-top-box together with a subscription to a particular package of broadcast services provided by a particular service provider. In this case, each set-top-box that is purchased is intended to be used only in conjunction with the services provided by particular service provider, and no others. The group of subscribers to the broadcast services of a particular service provider and the corresponding group of set-top-boxes may be referred to as a market. Each set-top-box that is intended to be used only in conjunction with the services provided by a particular service provider may be said to be associated with that service provider, or the corresponding market. Each service provider may be identified using a unique identifier, which may be referred to as a sales type code (STC). The STC value may be for example a number or any other suitable code to distinguish the different service providers.

The circuit 3 comprises an STC store or memory 9 for storing the STC value of the service provider the set-top-box containing the circuit is associated with. When an STC value is stored in the STC memory 9, the circuit 3 may be said to be personalized to the service provider or market corresponding to the stored STC value since, as described in greater detail below, this restricts the set-top-box to using only those cryptographic keys associated with that service provider. In one embodiment, the STC memory 9 comprises a memory whose contents cannot be modified such as a read only memory (ROM) or a one-time-programmable (OTP) memory. In this way, once the circuit has been personalized to a particular market it cannot be re-personalized to a different market.

The set-top-box is controlled by software executed by a processor (not shown). The software controls various aspects of the operation of the set-top-box including various cryptographic processes that decrypt the encrypted broadcast signals received by the set-top-box. The process of decrypting broadcast signals may also involve various subsidiary cryptographic processes which are provided in order to increase the overall security of the system. In order to perform these various cryptographic processes and to function properly, the software is supplied with one or more cryptographic keys, hereinafter referred to simply as keys. For example, in the illustrated embodiment, the software is supplied with a key, PBK1, to enable the software to function properly and to decrypt the television signals.

The PBK1 may be used for example to directly decrypt the television signals or to decrypt control words used to descramble the television signals. In another example, the PBK1 may be used to signature check the software according to any suitable signature checking technique known in the art. The software is only allowed to be executed if the signature check is passed, which occurs only if the correct PBK1 is supplied. In yet a further example, the PBK1 may be used to signature check configuration messages which are used to enable various features within the set-top-box. Only if the signature check on a particular configuration message is passed is the configuration message acted upon to enable a feature. The set-top-box will only function properly if the appropriate features are enabled, which only occurs if the correct PBK1 is supplied in order that the signature checks are passed. Many other examples will be apparent to the skilled person. In the embodiments described the PBK1 is a public decryption key used to decrypt television signals that changes relatively infrequently.

It can be seen that in each example described above, proper functioning of the set-top-box depends on the correct PBK1 being supplied. The circuit 3 comprises a key store or memory 7 arranged to store the PBK1 that is used by the software. During use, the PBK1 stored in the key memory 7 is retrieved and supplied to the software at the appropriate time.

Encryption of television signals using keys is used to prevent unauthorized access to broadcast services by persons who have not made the appropriate payment. Similarly, the television signals corresponding to the broadcast services of different service providers are encrypted using different keys to prevent subscribers to the services of one service provider from accessing services provided by another service provider. Each key used in conjunction with a particular service provider's services may be said to be associated with that service provider, or market. For example, a key is associated with a service provider if that key is used to decrypt television signals corresponding to that service provider's services. In the illustrated embodiment there will therefore be a different PBK1 for each service provider, or market. The PBK1 associated with a particular market m may be denoted by $PBK1_m$. In order to prevent set-top-boxes associated with a first market m1 from being used in conjunction with services provided for a second market m2, it is sufficient to prevent the $PBK1_{m2}$ associated with the second market from being used in the set-top-box associated with the first market. In this way, the set-top-box associated with the first market is prevented from being able to decrypt television signals corresponding to services provided by the second service provider.

In one embodiment, the key memory 7 comprises a rewriteable memory such as a random access memory (RAM) or a register to allow the PBK1 to be updated. For example, a service provider may periodically change the keys used to encrypt the broadcast television signals to increase security. The service provide would then also periodically change the PBK1 key stored in the key memory used to decrypt the television signals. Usually, when the software used by the set-top-box is changed or upgraded the keys used by the software are also changed. In this case, the PBK1 stored in the key memory 7 would be changed when the software is upgraded.

The version of a PBK1 key may be specified using a version control code (VCC) which may be, for example, a number or any other suitable code. For example, a first PBK1 may be specified by a VCC having a value of 1. Then, when a new PBK1 replaces the existing PBK1, the new PBK1 may be specified by a VCC having a value of 2. When this PBK1 is replaced with yet a further PBK1, this may be specified by a VCC having a value of 3, and so on. The version v of a PBK1 associated with a particular market m may be denoted by $PBK1_{m,v}$. The VCC value associated with a PBK1 may be thought of as indicating the age of the PBK1 with higher numbers indicating more recent keys. In the case where the PBK1 is changed when the software is updated, there is a correspondence between different versions of the software and different versions of PBK1 so the VCC value of a PBK1 may be considered to also indicate the version of the software that requires that PBK1.

The circuit 3 comprises a version control code (VCC) store or memory 11 to store a VCC value which identifies the version of PBK1 which the circuit 3 should be using, or which the circuit 3 is assigned to use or intended to use. For example, it may be desirable that the set-top-box uses only the latest available version of the software, in which case the set-top-box should be using only the latest version of PBK1 with the highest VCC value. In order to prevent old versions of software from being used by the set-top-box, it is sufficient to prevent keys associated with those old version of the software from being used in the set-top-box. When a VCC value is stored in the VCC memory 11, the circuit 3 may be said to be personalized to the version of PBK1 or software using PBK1 corresponding to the stored VCC value since, as described in greater detail below, this restricts the set-top-box to using only that particular version of PBK1 or software.

In one embodiment, the VCC memory 11 comprises a memory arranged so that the stored VCC value can be modified but only in such a way as to increase the value. For example, in one embodiment the VCC memory 11 comprises a series of components having two states in which the state of individual components can be permanently changed from a first state to a second state. The number of components in the second state represents the VCC value. In this way, the VCC value can be increased by causing one of the components to change state from the first state to the second state. However, since it is not possible to change a component back from the second state to the first state, it is not possible to cause the stored VCC value to decrease.

In this way, a VCC value may be stored in the VCC memory 11 thereby allowing the set-top-box to use the version of PBK1 corresponding to the stored VCC value, which in turn allows the corresponding version of software to properly execute. Then, when a software upgrade is downloaded together with a new PBK1 key, a new and higher VCC value may be stored thereby allowing the new PBK1 to be used, in turn allowing the upgraded software to properly execute. However, after this has been done, the old and lower VCC value cannot be stored in the VCC memory, preventing the old version of PBK1 from being used, thereby preventing the old software from being used. The effect of increasing the VCC value stored in the VCC memory 11 is to revoke the entitlement of the set-top-box to use the old key corresponding to the previous VCC value. This process may therefore be used to revoke keys in individual set-top-boxes belonging to subscribers who have subscribed to a service for a limited period of time only.

As described above, the STC memory 9 stores the STC value of the market associated with the set-top-box and the VCC memory 11 stores the VCC value of the key the set-top-box should be using. As also described above, the PBK1 stored in the key memory 7 is associated with a particular STC value and a particular VCC value. In order to determine whether the key actually being used by the set-top-box is one which is entitled to be used in the set-top-box, the circuit 3 determines whether the STC and VCC values associated with the PBK1 stored in the key memory 7 match the STC and VCC values stored in the STC memory 9 and the VCC memory 11. To achieve this the circuit 3 comprises a signature store or memory 13 which stores a key signature. A key signature is a piece of data that is associated with a key which contains information including the STC value and the VCC value of the associated key. In particular, the signature memory 13 stores the key signature, which may be denoted by SPBK1, associated with the PBK1 stored in the key memory 7.

In one embodiment, the key signature SPBK1 201 comprises an encrypted version of a string formed by concatenating a plurality of data fields. The first 203 and second 205 data fields contain respectively the STC value and the VCC value of the key the key signature is associated with, in this case PBK1. A third data field 207 contains data derived from the key the signature is associated with, such as a hash value of the key. The hash value may be generated by any suitable hashing function H such as the secure hash standard SHA-1. The string may be encrypted using any suitable encryption function $\epsilon$. In one embodiment the string 201 is encrypted using the asymmetric cryptographic function RSA using a private encryption key PVK0 so that the signature 201 may be decrypted using the complementary public decryption key PBK0. The key signature 201 may be denoted by $S_{PBK1}=\epsilon_{PVK0}(STC|VCC|H(PBK1))$ where | indicates concatenation. FIG. 3a is a schematic diagram of a key signature 201 having this particular form. In this example, the signature 201 comprises an encrypted string. It is understood however that other forms of coding, scrambling or obfuscation of the necessary values may be used to generate signatures.

When a key is received and stored in the key memory 7, the associated key signature is received and stored in the signature memory 13. For example, the key and the signature may be received from the relevant service provider after being broadcast to the set-top-box, for example over air. The PBK1 may be received at a first input 51 of the circuit 3 and transmitted to the key memory 7 via a data pathway, and the signature may be received via a second input 53 of the circuit 3 and transmitted to the signature memory 13 via a data pathway. The key and its associated signature may be broadcast together or separately. The signature thus provides information relating to the STC and VCC values associated with the stored key.

When it is time for the software to use the PBK1 stored in the key memory 7, the key signature S stored in the signature memory 13 is passed to a decryption circuit 15. The decryption circuit also receives a decryption key PBK0 stored in a memory 17. The decryption circuit 15 is arranged to decrypt the signature using PBK0 to obtain the string containing the STC value, the VCC value and the hash value. The decryption circuit 15 and the memory 17 may together be regarded as a decoding circuit 49 which acts to decode the coded signature (in this case decrypt the encrypted signature).

The three values contained in the key signature are then separated and each one is transmitted to a separate register. In particular, the STC value contained in the key signature is stored in an STC register 19, the VCC value contained in the key signature is stored in a VCC register 21 and the hash value contained in the key signature is stored in a hash register 23.

The hash value stored in the hash register 23 is transmitted to the first input of a first comparator 25. The PBK1 stored in the key memory 7 is transmitted to a hash circuit 27 which is arranged to produce a hash value of PBK1 using the same hash function, H, as that used to generate the key signature. The hash value generated by the hash circuit 27 is then transmitted to a second input of the first comparator 25. The first comparator 25 is arranged to compare the values received at the first and second inputs and to generate an output according to the comparison. In particular, the first comparator 25 is arranged to assert an output only if the two input values are identical. In this way the first comparator 25 will only assert an output if the key stored in the key memory 7 is the same as the key used to generate the key signature. Accordingly, if the first comparator 25 asserts an output, this provides a verification that the key signature stored in the signature memory 13 is associated with the key stored in the key memory 7. If the key signature stored in the signature memory 13 was not a valid signature with respect to the key stored in the key memory 7, for example because the signature is associated with a different key or the key signature was encrypted using the wrong encryption key, the output of the first comparator 25 would not be asserted.

The VCC value stored in the VCC register 21 is transmitted to a first input of a second comparator 29. The VCC value stored in the VCC memory 11 is transmitted to a second input of the second comparator 29. The second comparator 29 is arranged to assert an output only if the two input values are identical. In this way, the second comparator 29 will only assert an output if the VCC value stored in the VCC memory 11 is the same as the VCC value contained in the key signature.

Similarly, the STC value stored in the STC register 19 is transmitted to a first input of a third comparator 31. The STC value stored in the STC memory 9 is transmitted to a second input of the third comparator 31. The third comparator 31 is arranged to assert an output only if the two input values are identical. In this way, the third comparator will only assert an output if the STC stored in the STC memory 9 is the same as the STC contained in the key signature.

The outputs of the first 25, second 29 and third 31 comparators are transmitted to three inputs of an AND gate 33 which is arranged to assert an output only if all three inputs are asserted. It can be seen that the AND gate 33 output is only asserted if the key signature stored in the signature memory 13 is valid with respect to the key stored in the key memory 7, and if the STC and VCC values associated with the key stored in the key memory 7 match the STC and VCC values associated with the set-top-box. In other words, only a specific version of PBK1 associated with a specific market, being that version and market the circuit is personalized to, will cause the output of the AND gate to be asserted.

The PBK1 stored in the key memory 7 is provided to the software only if the output of the AND gate is asserted. If the output of the AND gate is not asserted then a process may be initiated to impair functioning of the set-top-box, for example causing the PBK1 to not be provided to the software, or causing the circuit 3 to reset.

The first 25, second 29 and third 31 comparators together with the AND gate 33 may be regarded as forming a comparison circuit 47 which acts to compare the values stored in the key memory 7, STC memory 9 and the VCC memory 11 with the corresponding values contained in the key signature and to output a signal according to these comparisons.

The key signature is generated by a trusted party, who may be referred to as an authority, using the control module 5. In order that a service provider can provide subscribers with the correct key signature along with a PBK1 key, the service provider transmits the PBK1 to the authority. The authority stores the PBK1 in a first memory 35 in the control module 5. The authority also stores the STC value associated with the service provider in a second memory 37 in the control module 5 and the VCC value of the received PBK1 in a third memory 39 in the control module 5. The PBK1 stored in the first memory 35 is transmitted to a hash circuit 41 in the control module 5 which is arranged to output the hash value of PBK1, using the hash function H, to a first input of an encryption circuit 43. The STC value and the VCC value stored in the second 37 and third 39 memories are transmitted respectively to second and third inputs of the encryption circuit 43. The encryption circuit 43 also receives a private encryption key, PVK0, from a memory 45. The encryption circuit 43 is arranged to concatenate the STC value, the VCC value and the hash value and to encrypt the resulting string using PVK0 in the manner described above to generate the key signature SPVK1. The key signature S is then output from the control module 5 and transmitted back to the service provider. The service provider can then transmit the PBK1 together with the associated signature $S_{PVK1}$ to the set-top-boxes of the relevant subscribers.

In order to maintain the integrity of the system, the authority should only generate key signatures for keys associated with authorized service providers. Furthermore, the authority should only generate key signatures in which the STC and VCC values contained in the signature are those associated with the key from which the hash value in the key signature was generated.

It is important that only authorized parties, in this case the authority, are able to generate correct key signatures since the ability to generate signatures would allow unauthorized parties to circumvent the security of the system. It is therefore important that the encryption key, PVK0, or any other secret data or information used to generate key signatures is known only to the authority, or any other party authorized to produce signatures. In particular, it is important that at least part of the overall algorithm used to generate signatures, including the particular hash function, H, used, the particular encryption function, $\epsilon$, used, the particular encryption key, PVK0, used and the particular format of the signature, is kept secret. This ensures that unauthorized parties cannot produce a valid key signature for a particular key. If the wrong encryption key, hash function, cryptographic function or format were used to produce the key signature the comparisons performed in the set-top-box would fail. It is also important to prevent the contents of the memory 17 containing the decryption key PBK0 used to decrypt signatures from being modified by unauthorized parties. If this were possible then an unauthorized party could generate a signature using an arbitrary encryption key containing any desired VCC and STC values. The signature would then be decrypted properly if the correct hash and encryption functions were used and if the corresponding decryption key were stored in the memory 17.

In applications where sensitive data is involved, such as pay-television systems, it is preferable that the sensitive data is as secure and secret as possible. For example, in a pay television system according to one embodiment of the invention, the PBK1 key, the corresponding signature used to verify the authenticity of the key and the PBK0 key used to decrypt the signature are each required to decrypt encrypted television signals. It is therefore preferable that this data is kept as secret as possible and that the key memory 7, and the memory 17 are not allowed to be read from or written to by unauthorized parties. In addition since the hash function H and the cryptographic function $\epsilon$ are used to generate signatures, it is preferable that these functions are kept secret, and are known only to the authority, to increase the difficulty of creating illegitimate signatures by unauthorized parties.

It is important that the key signature is generated is such a way that the key signature cannot be separated into parts corresponding to the STC, VCC and hash values until the key signature is decrypted or otherwise decoded. In the embodiment described above, the process of encrypting the string containing the STC, VCC and hash values produces a signature in which each data bit of the signature is influenced by the each of the STC, VCC and hash values. This ensures that it is not possible to separate out the STC, VCC and hash values before the signature is decrypted thereby ensuring that it is not possible to produce illegitimate signatures by separating out one or more of the values and substituting new values. Once a signature has been decrypted, if new values are substituted at that time, a new signature could not be generated since the encryption key needed to produce the signature would not be known.

In the embodiments described above the key signature contained a value derived from the key associated with the key signature, the value being a hash value of the key. However, it is understood that other values derived from the key, or the key itself, may be used instead. What is required is that the key signature contains a value which connects the key signature with a particular key so that a check can be made that a specific key signature is valid with respect to a specific key. In one embodiment, illustrated in FIG. 3b, the value derived from the key comprises a concatenation of values 207a, 207b, . . . , 207n, each value formed by XORing a constant with the hash value of the key associated with the signature. The value derived in this way from PBK1 may be written as $c_1$ XOR H(PBK1)|$c_2$XOR H(PBK1)| . . . |$C_n$ XOR H(PBK1) where $c_1, c_2, \ldots, c_n$ are constants and H(PBK1) is a hash value of PBK1. In this case, the key signature would be of the form S=$\epsilon_{PVK0}$(STC|VCC|$c_1$XOR H(PBK1)|$c_2$XOR H(PBK1)| . . . |$c_n$XOR H(PBK1)). FIG. 3b is a schematic diagram of a key signature 209 having this particular form. Using this more complex form increases the security of the system since a signature of this form would be more difficult to generate illegitimately.

A further variation of the present invention will now be described which provides even greater flexibility. In this embodiment, the key signature 211, shown in FIG. 3c, contains not only the VCC and STC values in first and second fields 203, 205, but also in additional fields 213, 215 the memory addresses of the locations within the set-top-box at which the corresponding STC and VCC values associated with the set-top-box are stored. For example, the memory addresses contained in the signature 211 may include the memory addresses of the VCC memory 11 and the STC memory 9, or any alternative memory locations. When the signature 211 is decrypted, the memory addresses at which the VCC and STC values are located are extracted to allow the set-top-box to locate the STC and VCC values stored in the set-top-box so that these values may be compared to the VCC and STC values extracted from the signature in the manner described above. In this way, the signature would have to contain not only the correct STC and VCC values, but also the correct memory addresses, thereby increasing the security of the system. FIG. 3c is a schematic diagram of a key signature 211 comprising the memory addresses of the VCC and STC values stored in the set-top-box.

In one embodiment, if a memory address specified in the signature is a null address, for example a zero address, this indicates that the corresponding STC or VCC value is not actually used. This provides a means for the authority to override the requirement for the circuit 3 to perform a check on the STC values and/or the VCC values. A hacker could not override these checks since it would not be possible for the hacker to generate a signature containing the appropriate null values without knowledge of the PVK0.

Providing the memory address of the VCC and STC values stored in the set-top-box together with the values that would be expected to be found at those locations if the key signature were valid in the signature provides significant flexibility in the system. Such an arrangement allows the possibility of the VCC and STC values to be stored at one of many different locations within the set-top-box as specified by the memory addresses in the key signature. Allowing the STC and VCC values to be stored at different locations provides scope for additional features provided by the present invention.

In a first example, the VCC and STC values may be stored at specified regions of an internal memory which is accessible by a security circuit which controls various security features of the set-top-box. The security circuit may be arranged to write appropriate STC and VCC values to the relevant regions of the internal memory, thereby allowing the STC and VCC checks to pass, only if certain security checks are passed. For example, the security computer may be arranged to execute a process to determine whether a security attack on the set-top-box has been attempted, for example by a hacker. Only if the security circuit determines that an attack has not been attempted are the appropriate STC and VCC values written to the relevant region of the internal memory.

The security circuit may also be arranged to determine the identity of the broadcast service provider from which received television broadcast data originated and to verify the validity or authenticity of the data. Then, depending on the identity of the broadcast service provider and, if the broadcast data is valid, the security circuit writes an appropriate VCC and/or STC value to the relevant region of the internal memory. The relevant part of the memory may be an region of the memory being unpredictable for a hacker and determined dynamically so that the same region is not used each time, thereby increasing the security of the system.

In a second example, the VCC value may be specified as being stored in a display buffer of the set-top-box. In this example the key associated with the VCC value is a key used to decrypt broadcast data which is updated frequently during a broadcast. During a broadcast, an updated key is received in advance together with a key signature which contains the address of the region of the display buffer at which the VCC value is supposed to be stored. The VCC value corresponding to the updated key is contained within the encrypted broadcast data so that when the broadcast data is decrypted (using the old key) and transferred to the display buffer, the appropriate new VCC value is also transferred to the display buffer. In this way, only if the relevant broadcast is already being viewed will the appropriate VCC value be stored in the display buffer allowing an updated key to be correctly verified, thereby allowing viewing of the broadcast to continue. It can be seen that correct verification of an updated key requires that the preceding key was previously correctly verified (in order that the broadcast data containing the new VCC value can be decrypted), according to one embodiment. By a process of induction, it can be seen therefore that correct verification of an updated key requires that all preceding keys were previously correctly verified, according to this embodiment.

In the embodiments described above the present invention is used to prevent a key from being used within set-top-boxes if the version of that key is not the same as that which the circuit 3 should be using, or if that key is associated with a different market to the set-top-box. However, it is understood that the present invention may be used to restrict the use of a wide variety of data according to a wide variety of conditions. For example the present invention may be applied to software directly rather than a key. In this case, the processes described above with respect to the PBK1 are carried out instead on a piece of software or an essential portion of the software. The relevant signature would then contain a hash value of the software and the VCC and STC values associated with the software. In the set-top-box, the hash value contained in the signature would be compared with a hash value produced from the software and the VCC and STC values contained in the signature would be compared with the VCC and STC values stored in the set-top-box as before. Examples of data other than keys and software to which the present invention may be applied will be apparent to the skilled person. If the present invention is used to restrict use of another kind of data, the signature would contain a hash value of that data.

In general, any type of operations data or data item, such as software or cryptographic keys, may be associated with a set of any number of values, each value in the set representing a property or attribute of the data such as the market the data item is associated with or the version of the data item. The operations data or a data item may be any data which is required by the circuit to correctly function. A general type of device, such as a set-top-box may also be associated with a corresponding set of values, each value representing a corresponding property or attribute of the device such as which market the device is associated with or which version of a data item the device is assigned to use. The present invention allows use of the data item within the device to be restricted according to whether the set of values associated with the data item match the set of values associated with the device, in other words, whether the properties or attributes of the data item match the corresponding properties or attributes of the device.

In some embodiments only a subset of the values may be required to match in order that use of the data item is allowed. Which subsets are required may be defined by one or more rules which may depend on the particular data involved or other conditions. In other embodiments, a predetermined difference may be allowed between a value associated with a data item and the corresponding value associated with the device for use of the data item to be allowed. In yet further embodiments, for a particular property or attribute, a data item or a device may have two or more values. This may be the case for example if a set-top-box could be used in conjunction with the services provided by several different service providers, or if different service providers shared the same keys.

Preferably, the circuit 3 is part of a monolithic device so that the components of the circuit 3 cannot easily be replaced and so that illegitimate data cannot easily be fed into, or extracted from the circuit.

From the foregoing it will be appreciated that, although specific embodiments of the invention have been described herein for purposes of illustration, various modifications may be made without deviating from the spirit and scope of the invention.

The invention claimed is:

1. A semiconductor integrated circuit for restricting use of a data item stored within the circuit, the circuit comprising:

a data memory for storing the data item;
one or more value memories, each value memory arranged to store a value;
a signature input for receiving a signature, the signature being derived from data in a data item field and a value in a first value field, the signature being in a coded form generated according to an algorithm;
a decoding circuit arranged to decode the signature and to extract and output information representative of the data in the data item field and information representative of the value in the value field; and
a comparison circuit arranged to receive the output of the decoding circuit and to determine whether the information representative of the data extracted from the data item field of the signature corresponds to the data item stored in the data memory and whether the information representative of the value extracted from the value field of the signature corresponds to a corresponding value stored in one of the one or more value memories, and further arranged to output a comparison signal according to results of the determinations;
in which the circuit is arranged to restrict the use of the data item stored within the circuit according to a state of the comparison signal.

2. A circuit according to claim 1 in which data in the first value field from which the signature is derived denotes a market with which the data in the data item field is associated, and the value stored in a first value memory of the one or more memories denotes a market with which the circuit is associated.

3. A circuit according to claim 2 in which the first value memory comprises an un-modifiable memory.

4. A circuit according to claim 2 in which the first value memory comprises a one-time-programmable memory.

5. A circuit according to claim 1 in which data in a second value field from which the signature is derived denotes a version of the data in the data item field, and a value stored in a second value memory of the one or more memories denotes a version of the data item the circuit is assigned to use.

6. A circuit according to claim 5 in which the second value memory comprises a modifiable memory.

7. A circuit according to claim 6 in which the second value memory is arranged so that the value stored therein may be increased but not decreased.

8. A circuit according to claim 7 in which the second value memory comprises a series of components each having two states, in which the state of each component may be changed permanently from a first state to a second state, and in which the number of components in the second state corresponds to the value stored in the second value memory.

9. A circuit according to claim 1 in which the data item comprises a cryptographic key.

10. A circuit according to claim 1 in which the data item comprises a portion of software.

11. A circuit according to claim 1 in which the signature is derived from memory addresses in one or more memory address fields, each memory address being a memory address of one of the one or more value memories, and in which the circuit is arranged to use the memory addresses in the signature to locate the values stored in the value memories within the circuit.

12. A circuit according to claim 11 in which at least one of the value memories comprises a region of a memory which is accessible by a security circuit.

13. A circuit according to claim 11 in which at least one of the value memories comprises a region of a display buffer.

14. A circuit according to claim 11 in which the circuit is arranged so that, if a memory address field contains a null value, the output of the comparison circuit is unaffected by the contents of the value memory corresponding to the memory address field containing the null value.

15. A circuit according to claim 1 in which the signature comprises a string encrypted according to an asymmetric cryptographic function using an encryption key and in which the decoding circuit comprises a decryption circuit arranged to decrypt the signature using a corresponding decryption key.

16. A circuit according to claim 15 in which the string is formed by concatenating one or more values in the value fields and a function of a data item in the data item field.

17. A circuit according to claim 16 in which the function of the data item is a hash value of the data item.

18. A circuit according to claim 16 in which the function of the data item comprises a concatenation of further values, each further value determined by performing an XOR function between a hash value of the data item and a constant.

19. A circuit according to claim 1 in which the comparison circuit comprises a plurality of comparators, a first comparator being arranged to compare the information representative of the data in the data item field extracted from the signature with the data item stored in the data memory, and a second comparator arranged to compare the information representative of the value in the value field extracted from the signature with the value stored in one of the value memories, each comparator being arranged to assert an output if the comparison results in a match, the comparison circuit further comprising an AND gate arranged to receive the signals output from each comparator as inputs and to assert an output comparison signal only if all of the inputs are asserted.

20. A circuit according to claim 19 in which the data item is allowed to be used by the circuit only if the comparison signal is asserted.

21. A circuit according to claim 20 in which the circuit is part of a monolithic circuit.

22. A television decoder, comprising:
a semiconductor integrated circuit for restricting use of a data item stored within the circuit, the circuit including:
a data memory for storing the data item;
one or more value memories, each value memory arranged to store a value;
a signature input for receiving a signature, the signature being derived from data in a data item field and a value in a first value field, the signature being in a coded form generated according to an algorithm;
a decoding circuit arranged to decode the signature and to extract and output information representative of the data in the data item field and information representative of the value in the value field; and
a comparison circuit arranged to receive the output of the decoding circuit and to determine whether the information representative of the data extracted from the data item field of the signature corresponds to the data item stored in the data memory and whether the information representative of the value extracted from the value field of the signature corresponds to a corresponding value stored in one of the one or more value memories, and further arranged to output a comparison signal according to results of the determinations;
in which the circuit is arranged to restrict the use of the data item stored within the circuit according to a state of the comparison signal.

23. A television decoder according to claim 22 for use in a pay-television system.

24. A system for restricting use of a data item, comprising:
a head end including:
a control module arranged to generate a signature, the signature being derived from data in a data item field and values in one or more value fields and the signature being in a coded form generated according to an algorithm; and
a transmitter for transmitting the signature; and
a receiving end including:
a receiver for receiving the signature transmitted by the head end;
a semiconductor integrated circuit for restricting use of a data item stored within the circuit, the circuit including:
a data memory for storing the data item;
one or more value memories, each value memory arranged to store a value;
a signature input for receiving the signature;
a decoding circuit arranged to decode the signature and to extract and output information representative of the data in the data item field and information representative of the value in the value field; and
a comparison circuit arranged to receive the output of the decoding circuit and to determine whether the information representative of the data extracted from the data item field of the signature corresponds to the data item stored in the data memory and whether the information representative of the value extracted from the value field of the signature corresponds to a corresponding value stored in one of the one or more value memories, and further arranged to output a comparison signal according to results of the determinations;
in which the circuit is arranged to restrict the use of the data item stored within the circuit according to a state of the comparison signal.

25. A system according to claim 24 in which the first value memory comprises a one-time-programmable memory.

26. A system according to claim 24 in which data in a second value field from which the signature is derived denotes a version of the data in the data item field, and a value stored in a second value memory of the one or more memories denotes a version of the data item the circuit is assigned to use.

27. A system according to claim 26 in which the second value memory comprises a modifiable memory.

28. A system according to claim 27 in which the second value memory is arranged so that the value stored therein may be increased but not decreased.

29. A system according to claim 28 in which the second value memory comprises a series of components each having two states, in which the state of each component may be changed permanently from a first state to a second state, and in which the number of components in the second state corresponds to the value stored in the second value memory.

30. A system according to claim 24 in which the data item comprises a cryptographic key.

31. A method for restricting use of a data item stored within a circuit, the method comprising the steps of:
receiving and storing the data item in the circuit;
receiving a signature, the signature being derived from data in a data item field and data in a first value field, the signature being in a coded form generated according to an algorithm;
decoding the signature and extracting information representative of the data in the data item field and information representative of the data in the first value field;
determining whether the information representative of the data extracted from the data item field of the signature corresponds to the data item stored in the circuit and whether the information representative of the data extracted from the first value field of the signature corresponds to a first value stored in the circuit; and
generating a comparison signal according to results of the determining step;
in which use of the data item is restricted according to a state of the comparison signal.

32. A method according to claim 31 in which the data in the first value field from which the signature is derived denotes a market with which the data in the data item field is associated, and the first value stored in the circuit corresponds to a market with which the circuit is associated.

33. A method according to claim 31 in which data in a second value field from which the signature is derived denotes a version of the data in the data item field, and a second value stored in the circuit corresponds to the version of a data item the circuit is assigned to use.

34. A method according to claim 33 further comprising the step of modifying the second value stored in the circuit.

35. A method according to claim 34 in which the step of modifying the second further predetermined value comprises the step of increasing the second value, and in which the stored second value is modified such that the second value cannot be decreased.

36. A method according to claim 31 in which the data item comprises a cryptographic key.

37. A method according to claim 31 in which the data item comprises a portion of software.

38. A method according to claim 31 in which the signature is derived from a memory address in a memory address field, the memory address being a memory address of the first value stored in the circuit, and in which the circuit is arranged to use the memory address in the signature to locate the first value stored in the circuit.

39. A method according to claim 38 in which the first value stored in the circuit is stored in a region of a memory which is accessible by a security circuit.

40. A method according to claim 38 in which the first value stored in the circuit is stored in a region of a display buffer.

41. A method according to claim 38 in which, if the memory address field contains a null value, the comparison signal is unaffected by the contents of the first value stored in the circuit corresponding to the memory address field containing the null value.

42. A method according to claim 31 in which the signature comprises a string encrypted according to an asymmetric cryptographic function using an encryption key and in which the method comprises the further step of decrypting the signature using a corresponding decryption key.

43. A method according to claim 42 in which the string is formed by concatenating the data in the first value field and a function of a data item in the data item field.

44. A method according to claim 43 in which the function of the data item comprises a hash value of the data item.

45. A method according to claim 43 in which the function of the data item comprises a concatenation of further values, each further value determined by performing an XOR function between a hash value of the data item and a constant.

46. A method according to claim 31 comprising the further steps of:
comparing the information representative of the data in the data item field extracted from the signature with the data item stored in the circuit and asserting a signal if the comparing results in a match;

comparing the information representative of the data in the first value field extracted from the signature with the first value stored in the circuit and asserting a signal if the comparing results in a match; and asserting an comparison signal if all of the signals are asserted.

47. A method according to claim 46 in which the data item stored within the circuit is allowed to be used by the circuit only if the comparison signal is asserted.

48. A method of operating a secure broadcast system, comprising the steps of:

broadcasting a signature, the signature being derived from data in a data item field and values in one or more value fields, and the signature being in a coded form generated according to an algorithm; and providing a semiconductor integrated circuit for restricting use of a data item stored within the circuit, the circuit including:

a data memory for storing the data item;

a value memory arranged to store a value;

a signature input for receiving the signature;

a decoding circuit arranged to decode the signature and to extract and output information representative of the data in the data item field and information representative of the value in the value field; and a comparison circuit arranged to receive the output of the decoding circuit and to determine whether the information representative of the data extracted from the data item field of the signature corresponds to the data item stored in the data memory and whether the information representative of the value extracted from the value field of the signature corresponds to a corresponding value stored in one of the one or more value memories, and further arranged to output a comparison signal according to results of the determinations; whereby the circuit functions properly only if the information representative of the data in the data item field corresponds to the data item stored in the circuit and if information representative of the data in the value field corresponds to the value stored in the value memory of the circuit.

49. A method according to claim 48 in which data in a second value field from which the signature is derived denotes a version of the data in the data item field, and a second value stored in the circuit corresponds to a version of the data item the circuit is assigned to use.

* * * * *